May 4, 1926.
L. J. LEON
WALL BRACKET
Filed Jan. 10, 1925
1,583,233
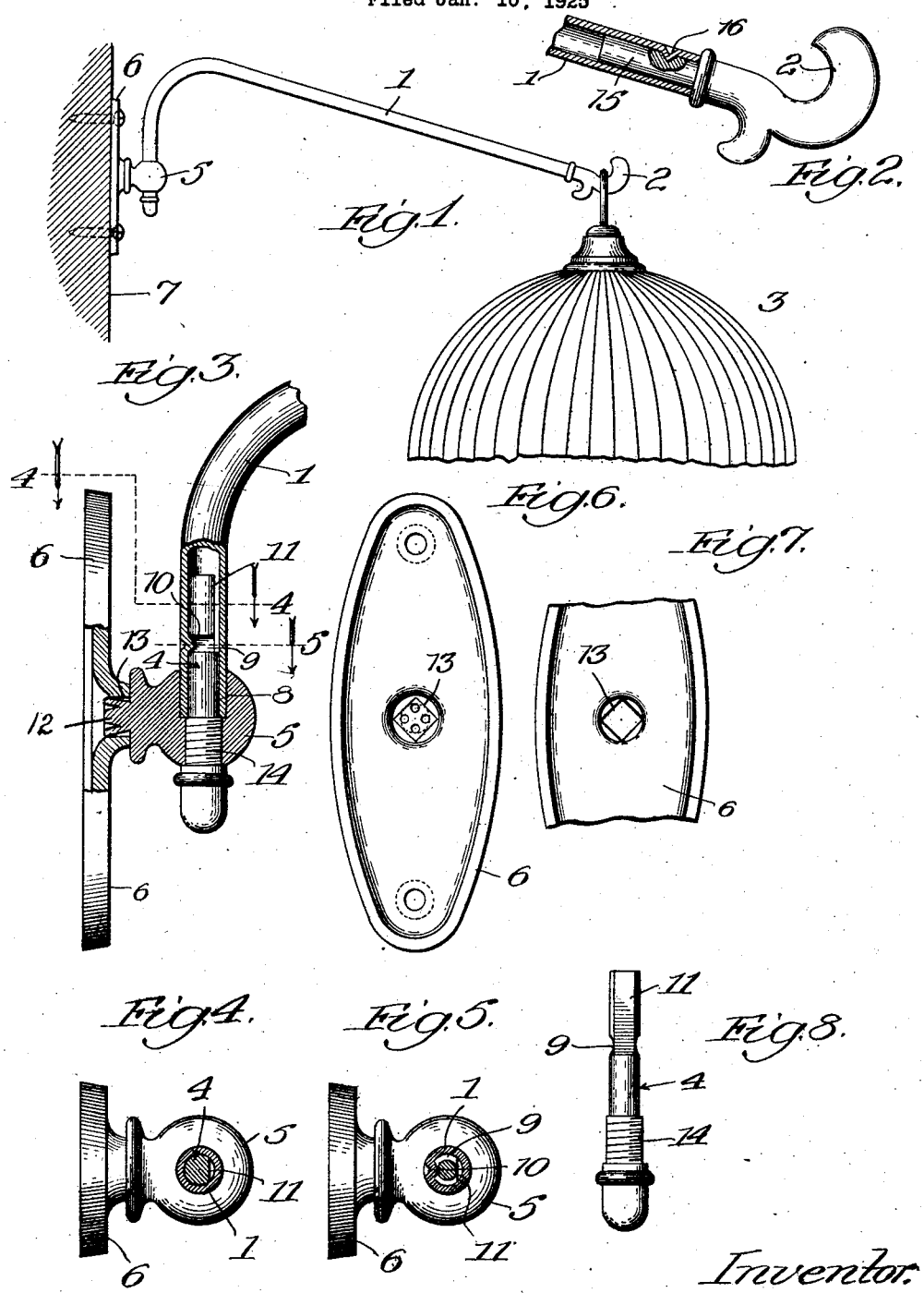
Inventor.
L. J. Leon, Patented May 4, 1926.

1,583,233

UNITED STATES PATENT OFFICE.

LEWICKI J. LEON, OF CHICAGO, ILLINOIS.

WALL BRACKET.

Application filed January 10, 1925. Serial No. 1,577.

*To all whom it may concern:*

Be it known that I, LEWICKI J. LEON, a citizen of the United States, residing at Chicago, in the county of Cook and State of Illinois, have invented new and useful Improvements in Wall Brackets, of which the following is a specification.

This invention relates to wall brackets particularly adapted for bird cages and consists in the matters hereinafter described and claimed.

In the accompanying drawings—

Fig. 1 is a side view of a bracket of my invention;

Fig. 2 is an enlarged view, partly in section, of the outer end of the bracket arm to show how the hook is applied;

Fig. 3 is an enlarged view of the inner end of the bracket with parts in section to show the hinge connection between the bracket arm and wall plate;

Figs. 4 and 5 are horizontal sectional views taken on lines 4—4 and 5—5, respectively, of Fig. 3;

Fig. 6 is a rear view of the wall plate;

Fig. 7 is a similar view before the knob is connected to the plate; and

Fig. 8 is a view of the hinge pin, to be hereinafter described.

The bracket comprises an arm 1 having a hook 2 at its outer end, on which may be hung a bird cage 3, as shown in Fig. 1. The arm 1 is preferably made from a tube and its inner end is bent downward to engage over an upright pin 4 carried by a knob 5 on a plate 6 by means of which the bracket may be fastened to a wall 7, as shown in Fig. 1. As shown in Fig. 3, the pin 4 extends above the knob 5 and engages the tube 1 on the inside. The knob 5 is provided about the pin 4 with an upwardly opening recess 8 to receive the inner end of the tube.

With the inner end of the tube 1 having an inside bearing against the pin 4 and an outside bearing against the wall of the recess 8, a relatively wide bearing is provided for the tube end to resist the tendency to bend the inner end of the tube by the weight of the bird cage or other article hung on its outer end. Moreover, with the tube end fitting in the recess 8, the tendency to crack or split the tube end under downward strains is prevented. Said recess also covers the joint between the tube end and the knob 5 to make a neat and finished article. The bearing surface afforded by the recess 8 allows the pin 4 to be shorter. This reduces the distance to which the tube must extend above the knob to clear the pin 4 and thus shortens the leverage on the tube at its bend.

By the pin 4 the tube 1 may hinge or swing about the knob 5 and thus be adjusted at any angle to the wall or be swung against the wall to be out of the way when not in use.

The pin 4 is provided with a horizontal groove 9 above the knob 5, and the tube or arm 1 is provided with an inwardly bulged portion 10 to enter said groove. The front of the pin 4 is provided with a flat face 11 extending from the upper end of the pin to the bottom of the groove so as to reduce the diameter of the pin and allow the arm or tube 1 to be slipped over the pin when the projection 10 is at said flat face. When the tube end reaches the bottom of the recess 8, the tube is turned, carrying its projection 10 into the groove 9 and the arm or tube is held from being raised off the pin. By having the flat face 11 in front of the pin, it is apparent that the tube or arm 1 cannot be raised off the pin in any position into which it may be swung when the bracket is fixed to a wall. Consequently, there is no opportunity afforded to dismantle the bracket when in use, nor allow the tube to come off the pin should the bird cage or other article hit upward against the outer end of the arm when being applied to or removed therefrom.

The knob 5 is preferably made separate from the plate 6 and is secured thereto by having a stud or lug 12 on the inner end of the knob and extending into a square hole 13 in the plate, as shown in Figs. 3, 6 and 7. This lug or stud 12 is initially made round and after being inserted into the square hole 13 the metal of the stud at the corners of the hole is forced outward by means of a punch or otherwise so as to fill the hole and thus hold the knob on the plate against turning.

As shown in Figs. 3 and 8, the pin 4 is provided with a threaded portion 14 to be screwed into the knob 5 from below the recess 8. This facilitates manufacturing the fixture and also assembling the same, in that the pin may be screwed into the knob after the knob and the plate have been polished after being assembled.

As shown in Fig. 2, the hook 2 has a lug 15 extending into the outer end of the tube arm 1 and is fixed therein by having a portion 16 of the tube forced into a notch in the lug 15.

The bracket shown and described is strong, has a neat and finished appearance, and is well adapted for use with bird cages.

The details of structure shown and described may be variously changed and modified without departing from the spirit and scope of my invention.

I claim as my invention:

1. A bracket of the character described, comprising an attaching plate having an outwardly extending knob, a pin carried by said knob and extending above the same, and a bracket arm having a tubular inner end to engage over said pin, said knob having a recess about said pin to receive the inner end of the arm.

2. A bracket of the character described, comprising an attaching plate having an outwardly projecting knob, a pin made separate from said knob and screwed into the same with a portion of the pin extending above the knob, and a bracket arm having a tubular inner end to engage over the portion of the pin above the knob, the latter having a recess about the pin to receive the inner end of said arm.

3. A bracket of the character described, comprising an attaching plate having an outwardly projecting knob, an upright pin carried thereby and extending above the same, and a bracket arm having a tubular inner end engaging over said pin above the knob, the latter having a recess about the pin to receive the inner end of said arm, said pin having a surrounding groove above the knob and a flat surface extending along the pin to the groove from the upper end of the pin, said arm having a projection to engage the groove and enabling the arm to be taken off and put on the pin when the projection is at said flat surface.

In testimony that I claim the foregoing as my invention, I affix my signature this 8th day of January, 1925.

LEWICKI J. LEON.